UNITED STATES PATENT OFFICE.

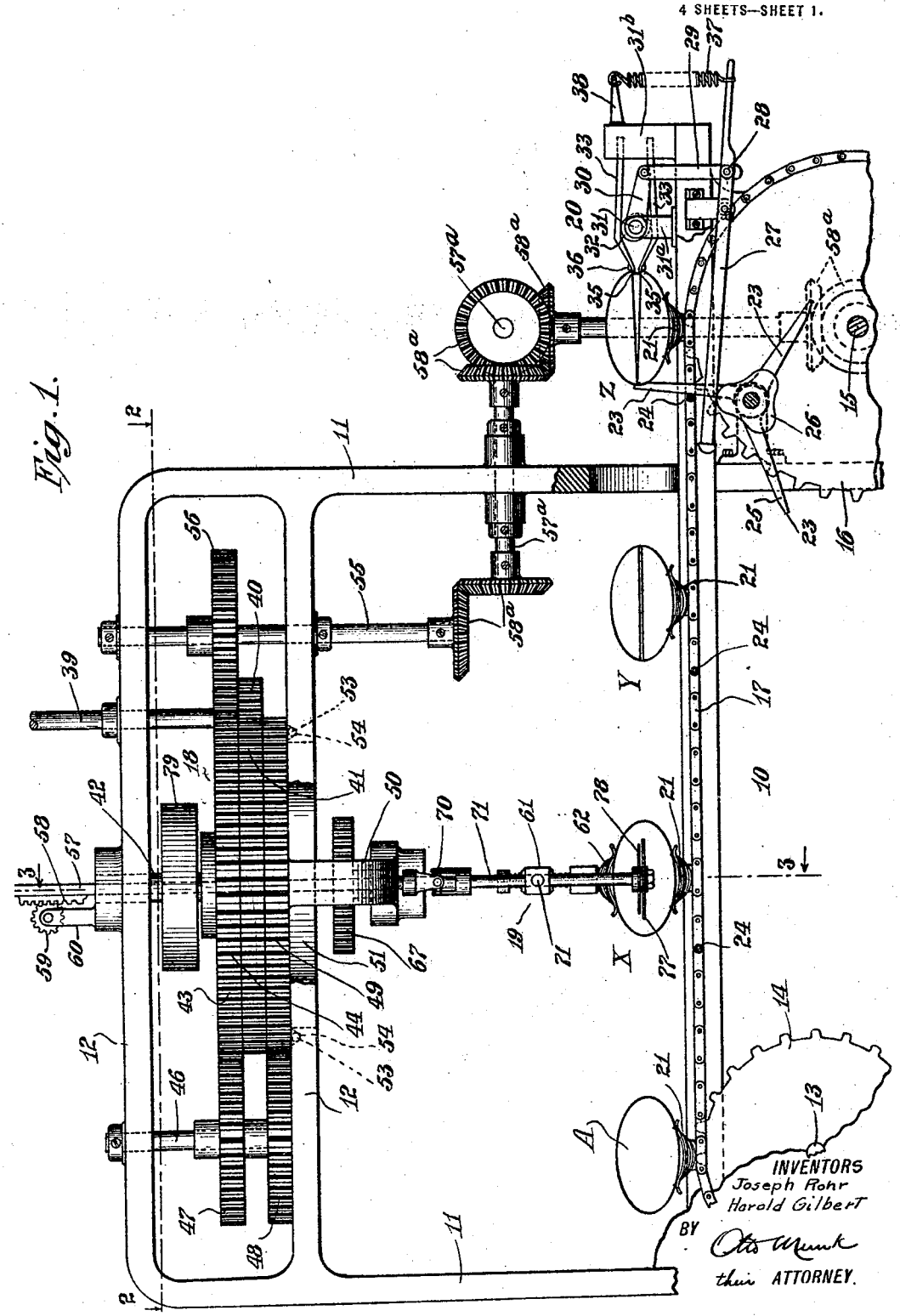

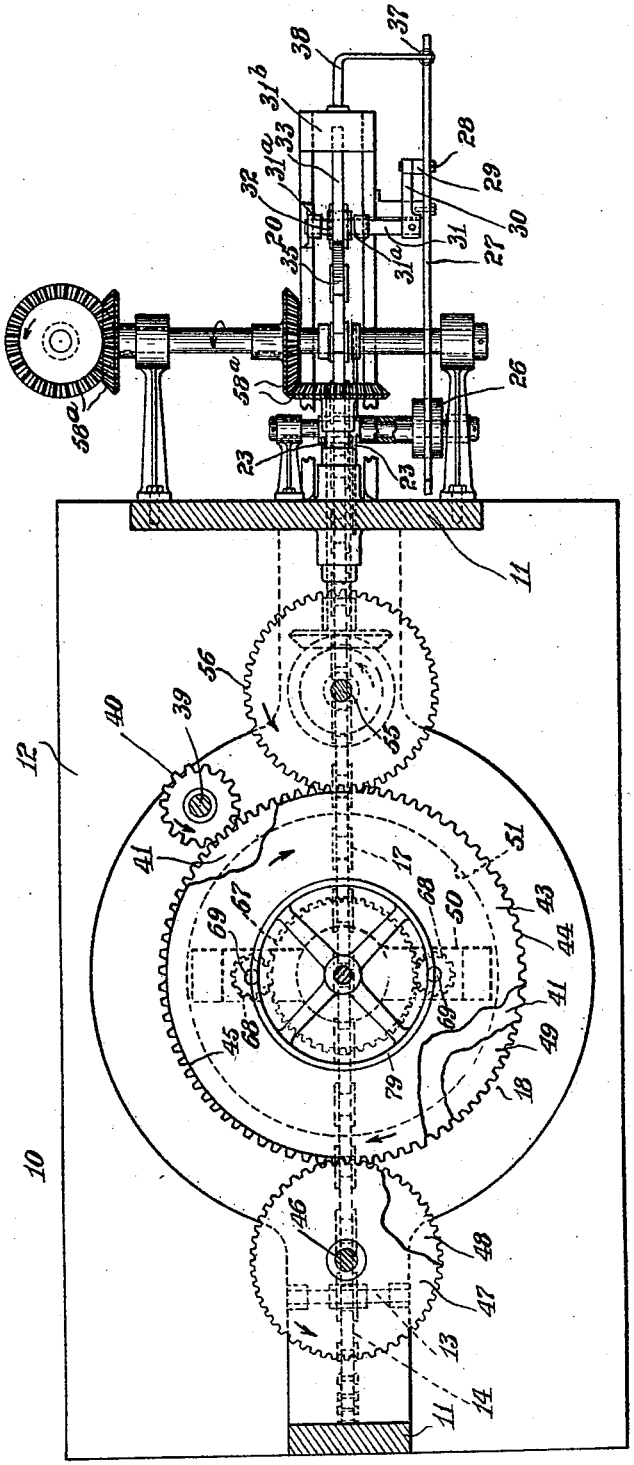

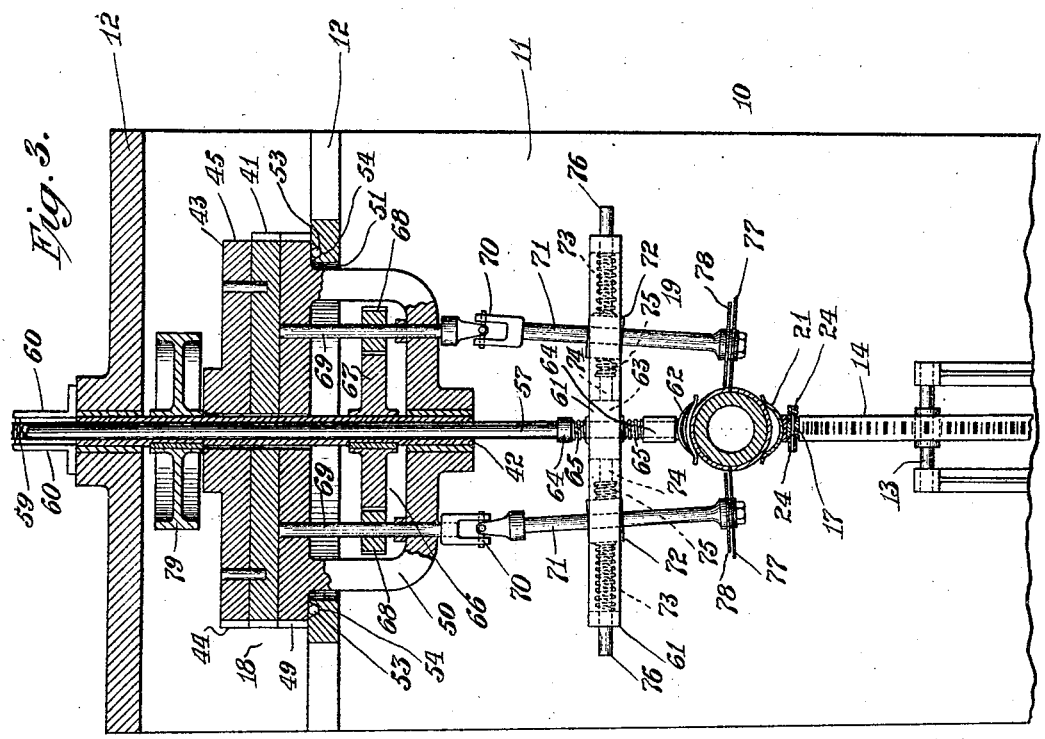

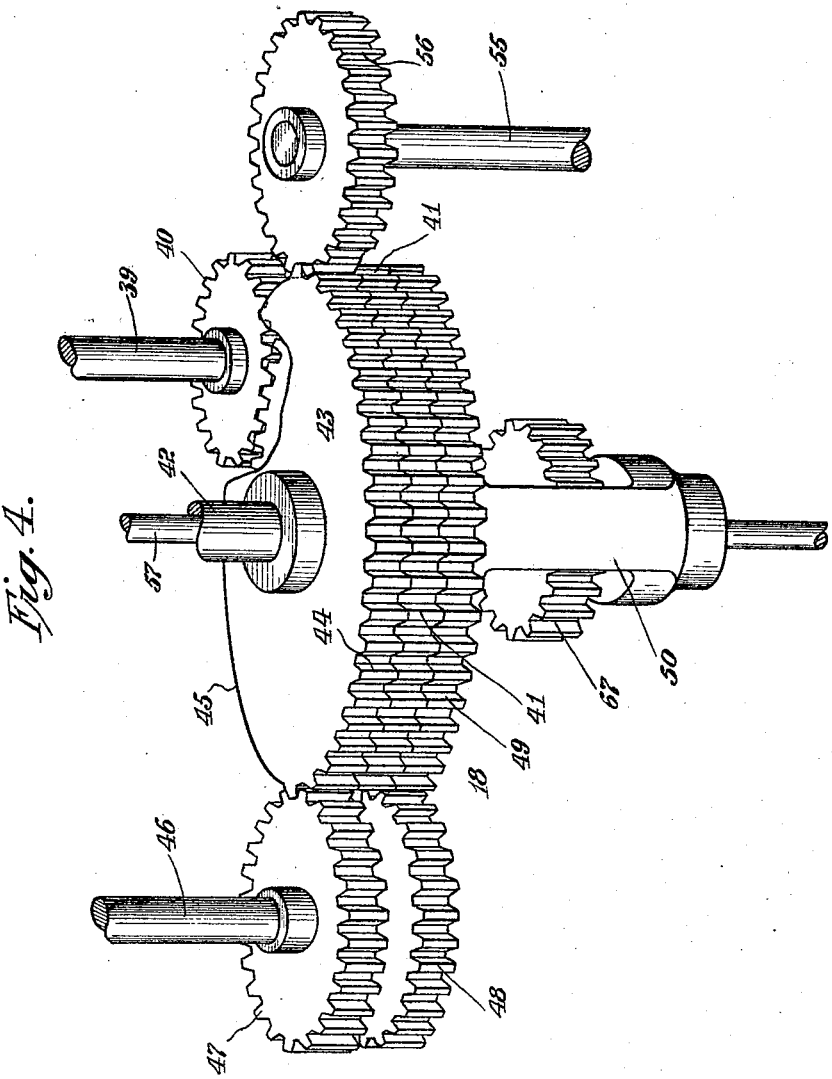

JOSEPH ROHR AND HAROLD GILBERT, OF BROOKLYN, NEW YORK.

DEVICE FOR REMOVING COCONUT SHELLS.

1,413,386.  Specification of Letters Patent.  Patented Apr. 18, 1922.

Application filed July 2, 1921. Serial No. 482,097.

*To all whom it may concern:*

Be it known that we, JOSEPH ROHR and HAROLD GILBERT, citizens of the United States, residing at Brooklyn, in the county of Kings and State of New York, have invented certain new and useful Improvements in Devices for Removing Coconut Shells, of which the following is a specification.

Our invention relates to a device for removing the shells from coconuts leaving the kernel intact, and has particular reference to a device that will first divide the shell into sections and then remove the sections from the kernel.

In the method of removing the shell from the kernel of the coconut as now practiced, the nut is subjected to a steam treatment which softens the shell and loosens its hold upon the kernel, whereupon, the shell may be cracked and removed from the meat. This method has been found to be very unsatisfactory, in that the kernel is often broken and the portion around the eyes will continue to adhere to the shell.

It is therefore, then, the object of this invention to provide a device which will first divide the shell through the eyes and then remove the shell from the kernel without injuring the latter.

Briefly stated this invention comprises a machine having an intermittent drive mechanism controlling the movement of a conveyer to carry coconuts into the path of a set of cutters which are adapted to make a continuous cut equatorially of the shell, and then further advance the severed nut to a device which removes the divided sections from the kernel.

The invention is illustratively exemplified in the accompanying drawing, in which Fig. 1, is a side elevational view of the mechanism for dividing and removing the coconut shell.

Fig. 2, is a substantially lateral sectional view taken on the lines 2—2 of Fig. 1.

Fig. 3 is a substantially vertical sectional view taken on the lines 3—3 of Fig. 1, and showing mechanism for driving the cutters and shell removing device.

Fig. 4, is a perspective view of the gear train.

Referring to Fig. 1, of the drawing, the supporting standard 10 has a superstructure 11 mounted thereon, the upper portion of which is connected together by parallel beams 12. Rotatably mounted on a fixed shaft 13 in the supporting standard 10 below the superstructure 11, at the receiving or feeding end of the machine, is an idle sprocket wheel 14. Aligned with the sprocket wheel 14 and keyed to a rotary shaft 15 journaled in suitable bearings in the standard 10, at the delivery end of the machine, is a sprocket wheel 16. These sprocket wheels 14 and 16 receive a conveyer chain 17, which moves in a step by step movement longitudinally of the machine.

Power is applied to the moving parts of the machine by any suitable means, not shown, and which is distributed from a gear train generally indicated at 18 and mounted between the parallel beams 12. A rotary cutting mechanism 19 carried by a portion of the gear train 18 is hung below the lowermost beam 12 so that its path of operation will be above the conveyer chain 17 and on a plane level with the polar axis of the coconuts supported upon the conveyer. Cooperable with the movement of the conveyer chain 17 on the supporting standard 10, rearwardly of the sprocket wheel 16, is a shell removing device 20 which engages the shell of the nut to remove the latter from the kernel.

The feeding mechanism comprises a conveyer chain 17 carrying equally spaced nut holders 21. These holders 21 are preferably cup shaped and have upstanding points at each side thereof adapted to penetrate the shell to prevent the nut from becoming dislodged during its travel. Projecting from opposite sides of the chain 17, at a point substantially rearward of each of the holders 21, are laterally arranged contact rollers 24 provided to impart movement to the shell removing device 20.

Rotatably mounted, in suitable hangers, closely adjacent opposite edges of the conveyer chain 17 and in the path of the contact rollers 24 are star wheels 25. During operation the rollers contact with the rear edge of each spoke 23 of the star wheels 25 and at a stage in its travel when the conveyer has about completed its full movement, the rollers 24 move the tips of the spokes 23 against the rear polar end of the coconut. A clover-leaf cam 26, having its high points positioned rearwardly of the spokes 23 of the star wheel 25, is carried by the latter and rotates therewith. Yieldably supported upon the cam 26 and pivoted on the standard 10 rearwardly of the sprocket wheel 16 is a lever arm follower 27 which supports, at the opposite side of the pivot 28, a vertical link 29. The upper end of the link 29 extends above the bed of the standard 10 and is pivoted to a rocker arm 30 mounted on a rock shaft 31 supported in upstanding brackets 31ᵃ which are secured to the bed of the standard 10. Fixed to the rock shaft 31 is an elliptical cam 32 which is brought into contact with the upper and lower spring jaws 33 carried by a standard 31ᵇ on the standard 10. These jaws are so arranged that they constantly rest against opposite sides of the cam 32 and due to the fact that the high points of this cam are the same and at opposite sides of a center it will follow that any movement of the cam will cause each jaw to move to or away from the other. The free ends of the jaws 33 are inclined inwardly to a point where they meet and are provided with chisel shaped projections or nibs 35 adapted normally to engage, forming an instrument which tapers off to a sharp edge. In operation this edge is introduced into a cut made in the coconut shell by the rotary cutting mechanism, hereinafter more fully described. In order that the nibs or projections 35 may be prevented from penetrating the surface of the kernel within the shell, an upstanding web 36 is provided at the outer surface of each nib and at a point behind the latter which is equal to the thickness of a coconut shell.

The lever arm 27 is held against the cam 26 by a coiled spring 37 supported from a bracket 38 and provided with a hook at its lower end engaged about a rearwardly extended portion of the lever arm 27.

Any suitable intermittent drive may be provided to advance the conveyer chain 17 so that it moves in synchronism with the rotary cutting mechanism 19. It is preferable, however, to provide a main power distributing member from which all moving parts may be timed. One form of such a distributing member is shown and indicated at 18 and clearly illustrated in Figure 4. This gear train 18 includes a constantly rotating vertical shaft 39 provided with a pinion gear 40 meshing with a spur gear 41 idly mounted to be rotated about a hollow spindle 42 which is supported in the uppermost beam 12. Carried by the gear 41 directly over the latter and loosely surrounding the hollow spindle 42 is a mutilated gear 43 having its periphery divided into two segments; one being provided with teeth 44 and the other segment being a blank portion 45. Idly mounted on a fixed vertical shaft 46 between the parallel beams 12, at one side of the gear 43, is a spur pinion 47 which meshes with the teeth 44 of the mutilated gear 43. The pinion 47 is composed of a lower toothed portion 48 which is separated from the upper portion 47 by a blank portion adapted to span the gear 41 and mesh with a third spur gear 49 also loosely mounted about the spindle 42. This gear 49, as shown in Figure 3, is entirely independent of the gear 41 under which it is located and merely acts in the capacity of a support for the superposed gears 41 and 43. The under side of the gear 49 is provided with a depending stirrup 50 which projects below the lowermost beam 12 and through an opening 51 therein. In order that the frictional engagement of the gear 49 and the surface of the beam 12 may be reduced to a minimum, suitable ball bearings 53 are interposed between the two surfaces and are retained in oppositely arranged ball races 54. It might be noted that similar anti-friction means may be provided between the gears 41 and 49, but for simplicity of illustration this has not been shown in the drawing.

Rotatably mounted in the beam 12 about the gear 43 at a point diametrically opposite the shaft 46, is a vertically arranged shaft 55 which carries a pinion 56 adapted to mesh with the mutilated gear 43. This portion of the gear train provides the intermittent drive for the conveyer 17 and consists of shafts 57ᵃ carrying bevel gears 58ᵃ which transmit power from the mutilated gear 43 to the sprocket shaft 15 before referred to.

Reciprocally mounted within the hollow spindle 42 and projecting below the lowermost edge of the stirrup 50 is a rod 57 having its upper end provided with a rack 58 meshing with the teeth of a pinion 59 supported in suitable hangers 60 arranged on the outer surface of the lowermost beam 12. The lower portion of the rod 57 projecting below the stirrup 50 extends through a horizontally disposed bracket 61 and carries at its extreme end a cup shaped receptacle 62 which overlies the holders 21, as the latter are advanced by the movement of the conveyer. The rod 57 extends through a hub 63 in the bracket 61 and spaced substantially away from each face of the hub 63 is a collar 64 which limits the expansion of coiled springs 65 arranged between the collars 64 and the hub 63. This construction provides a resilient support for the rod 57 so that as a nut advances and engages the forward edge of the receptacle 62 the latter will simply ride up and over the surface of the shell until properly centered, whereupon the nut will be firmly held in position while being divided by the cutting mechanism 19. It will be noted that the rod 57 supports the bracket 61 and as the rod is raised or lowered there will be a corresponding vertical adjustment of the bracket.

Referring now to Figure 3, the cutting mechanism 19 is carried by the stirrup 50 and includes a planetary gear system 66 mounted to rotate with the hollow spindle 42 intermediate the under side of the gear 49 and the stirrup 50. The sun gear 67, of this train, is rotated by the constantly rotating spindle 42 to which it is keyed and meshes with planet gears 68 carried by vertical shafts 69 journaled in the gear 49 and stirrup 50. Suitable universal joints 70 connect the lower ends of the shafts 69 with oscillatory shafts 71 which bear in floating bearings 72. The horizontal bracket 61 is provided with slots 73 to receive the bearings 72, one on each side of the hub 63. Radially projecting spokes 74 in the hub 63 are provided with coiled springs 75 bearing against the inner side of the bearings 72. The opposite ends of the bracket 61 are orificed to receive spring actuated plungers 76 which project inwardly and against the opposite or outer side of the bearings 72. The lower end of each shaft 71 carries suitable circular cutting edges, preferably saw-toothed disks 77, slightly below circular guards 78 which are of somewhat smaller diameter than the disks themselves. The saw disks and guards are mounted to rotate together and from the disclosure it will be apparent that when the cutting disks engage the shell of a nut the greatest possible depth of the cut will be determined by the marginal toothed portion of the disk 77 which projects beyond the periphery of the guard 78. In preparing the shell for the final step of removing the halved portions, the position of the guards 78 which determines the depth of cut to be made, is carefully set so that the surface of the kernel will not be injured by the saw teeth. The construction just described provides an automatically operated adjustment of the cutting disks to accommodate various sizes of nuts which may be fed to the cutters. Referring particularly to Figure 3, there is clearly shown, the spring actuated bearings 72 having a normal tendency to move toward each other. During operation the cutter mechanism as a whole rotates one half a turn and then pauses while the conveyer advances a step with a succeeding coconut, and it is important that the pause should take place while the saw disks 77 are in a transverse position across the bed of the machine; in order that the shell may be introduced between the blades. The disks themselves, however, constantly rotate at high speed, hence the independent drive pulley 79 which is carried by the spindle 42 adjacent its bearing in the beam 12.

In the operation of this invention, the function of the parts will be set forth in the general order of the sequence of their occurrence. It may be assumed that the mechanism is in a position so that the conveyer 17 has just been brought to rest and a holder 21 is at the receiving end of the machine. At this interval the blank portion 45 of the mutilated gear 43 is passing over the teeth of the pinion 56, and as a result the entire conveyer mechanism will remain inactive. A coconut is then placed in the first holder 21 at A in Fig. 1. It is desirable although not essential to place the nut so that its polar axis will be parallel with the direction of movement of the conveyer. Following this period of rest the teeth 44 of the gear 43 will engage with those of the pinion 56 and the conveyer 17 will advance until the mutilated gear will have made one half of a revolution. With this advance of the conveyer 17 the nut is positioned directly below the upper receptacle 62. In assuming this position the surface of the advancing shell engaged against the edge of the upper receptacle 62 and the latter was compelled to ride upon the inclined surface of the shell against the action of the springs 65. There was a simultaneous elevation in the position of the bracket 61 holding the cutters, with the result that the blades or saw disks 77 were brought substantially in line with the equator of the shell.

At this point in the operation the gear 43 has completed one revolution and is again ready to stop further movement of the conveyer. The teeth 44 are now brought into engagement with those of the pinion 47 and rotary movement will be imparted to gear 49 and the stirrup 50. The saw disks which are constantly rotating, move about the equator of the shell to make a continuous cut therein; the complete movement of each saw disk being but one half of a revolution, it follows that each cutting disk merely moves to the opposite side of the nut to make a continuous cut about its shell. The blank portion 45 of the gear 43 again moves over the pinion 47 and the revolving cutter mechanism is brought to a halt, while the pinion 56 at the opposite side of the gear 43 is again engaged by the teeth 45 to advance the conveyer another step.

The distance between the cutting mechanism 19 and the shell removing device may be varied. For illustrative purposes I have shown that two steps are required to bring the nut in engagement with the shell removing device. At Y the shell of the nut is shown as it would appear after having been divided by the cutters and from this position the nut will be advanced to its final position at the delivery end of the machine indicated at Z. The conveyer chain 17 in moving the nut to this final position moves the rollers 24 to engage against the rear side of the spokes 25 and the latter are forced to rotate until their tips engage the rear end of the shell at each side of the center. The spokes 25, however, do not exert any substantial amount of pressure against the nut until the chain 17 has about completed its travel at which instant the opposite end of the shell has engaged the nibs 35 of the spring jaws 33. There is still a slight distance for the chain to travel and due to the position of the axis of the star wheel being in advance of and substantially above the axis of the sprocket wheel 16, there will be a much more rapid rotation of the star wheel than of the sprocket wheel 16. And for this reason the pressure of the spokes 25 against the end of the nut will increase disproportionately to the lineal movement of the conveyer. Therefore, the nibs 35 are driven into the cut in the shell to the depth of the webs 36. Simultaneous with final movement of the conveyer 17 and the rotation of the star wheel 23 there is a rotary movement imparted to the cam 26 which in its turn lifts the lever arm 27 and rocks the cam 31 to separate the spring jaws 33. This position is shown at the location of the nut indicated at Z in Fig. 1, where the nibs 35 have moved apart and the shell separated from the kernel along the line of the cut. After the teeth 44 of the mutilated gear 43 pass out of engagement with the pinion 56 the conveyer 17 will again come to rest and the nut with the loosened shell may be readily removed from the holder 21.

Each subsequent nut as it is fed along on the conveyer is similarly treated so that when the machine is running there will be four nuts constantly in place upon the conveyer.

What we claim and desire to secure by Letters Patent is:—

1. In a coconut shelling machine, the combination of a conveyer, holders carried by said conveyer, means for making a continuous cut in the coconut shell, and means for separating the divided shell from the kernel at each side of said cut.

2. In a coconut shelling machine, the combination of a conveyer, holders carried by said conveyer, means for making a continuous cut in the coconut shell, and means cooperating with said conveyer to separate the divided shell from the kernel at each side of the cut.

3. In a coconut shelling machine, the combination of a continuous conveyer, holders thereon to receive the coconuts, means for making a continuous cut in the shell of said coconut, mechanism for removing the divided shell from the nut and means carried by said conveyer to operate said mechanism.

4. In a coconut shelling machine, the combination of a continuous conveyer for carrying coconuts, a shell cutting device operable in the path of travel of said coconuts, and engaging members carried by said conveyer and adapted to contact with rotary yieldable members on said machine for operating parts thereof.

5. In a coconut shelling machine, the combination of a conveyer adapted to pass through said machine, rollers projecting laterally from said conveyer, a shell dividing mechanism mounted above said conveyer and in the path of movement of said coconuts, actuating means for the shell dividing mechanism and means adapted to be engaged by said rollers to operate said actuating means.

6. In a mechanism for shelling coconuts, a conveyer having holders thereon, and projections extending above the outmost portions of said holders and adapted to penetrate the surface of the coconut shell.

7. In a mechanism of the character described, the combination of a conveyer, a shell cutting mechanism and a shell removing device adapted to have a part thereof actuated by said conveyer, whereby said shell removing device may be operated simultaneously with the advance of said conveyer.

8. In a mechanism of the character described, the combination of a conveyer carrying coconut holders, a rotary cutting device for making a continuous cut in the shell of said coconut, a resiliently suspended holder located axially of said rotary cutting device and adapted to overlie the conveyer holders, and a shell separating device cooperating with said conveyer to engage against the polar axis of said nut at one side and separate the divided shell at its opposite pole to remove the shell from the kernel.

9. In a mechanism for shelling coconuts, the combination of an intermittently driven conveyer having coconut receiving holders mounted thereon, an intermittently rotated cutting device operable with respect to said conveyer and adapted to make a continuous cut equatorially of said coconut, engaging members projecting laterally of said conveyer, and means engaged by said engaging members adapted to engage against one polar axis of said shell to present the opposite pole thereof to be separated from the kernel at each side of the cut.

10. In a mechanism for shelling coconuts, the combination of a conveyer, a shell cutting mechanism, a shell removing device adapted to have a part thereof actuated by said conveyer, and an intermittent gear drive associated with said conveyer and said shell removing device so as to move the conveyer in a step by step movement and to rotate the cutting mechanism during the interval between each advancing step of the conveyer.

11. In a mechanism for shelling coconuts, the combination of a conveyer carrying coconut holders thereon, a rotary frame, cutting disks arranged on opposite sides of said frame, means for intermittently rotating said frame, and means for continuously rotating said cutting disks.

12. In a coconut shelling machine, the combination of a conveyer having holders thereon, a rotary cutting device adapted to make a cut in each side of the shell of a coconut to provide a continuous space about the equator of said shell, means for moving said conveyer and said cutting device alternately, and engaging members carried by said conveyer to operate mechanism for separating the halved shell from the kernel.

13. In a coconut shelling machine, the combination of a conveyer having evenly spaced holders mounted thereon, a shell cutting device suspended in the path of movement of said holders, said device comprising oppositely arranged saw disks resiliently held to facilitate lateral movement, means for continuously driving said disks, an extensible holder intermediate said disks and adapted to receive the nuts held on said first named holders, means for rotating said cutting device substantially half way around the shell of said nut to make a continuous cut through the shell, means for advancing said conveyer after each movement of said cutting device, and a cam actuated shell separating device adapted to cooperate with each advance step of said conveyer to remove said shell from the kernel and at each side of the cut.

In testimony whereof we have affixed our signatures.

JOSEPH ROHR.
HAROLD GILBERT.